April 16, 1968

J. E. HARMS 3,378,280

HITCH ASSEMBLY

Filed Oct. 21, 1965

INVENTOR
JACK E. HARMS
BY Dick, Zarley, McKee & Thomte

ATTORNEYS

United States Patent Office 3,378,280
Patented Apr. 16, 1968

3,378,280
HITCH ASSEMBLY
Jack E. Harms, Everly, Iowa 51338
Filed Oct. 21, 1965, Ser. No. 500,131
8 Claims. (Cl. 280—478)

ABSTRACT OF THE DISCLOSURE

A tongue assembly including a female socket member having converging side walls and top and bottom walls defining an opening through which a male member extends having a wedge shaped end portion matingly engaging the converging side walls of the socket member when the male and female members are in an extended position, an L-shaped locking member is pivotally mounted on the top wall of the socket member and includes a downwardly extending leg portion slidably engaging the top solid wall of the male member when said members are in their contracted position and adapted to drop by gravity only into locking engagement with the end edge of said wedge shaped portion when said male and female members are moved to their extended position, said top wall of said socket member engaging the other leg of said L-shaped locking member to limit its further downward pivotal movement. The L-shaped locking member is substantially narrower in width than the wedge shaped portion of the male member and the top wall of the female socket member. The side walls of the female socket member are channel shaped, facing inwardly and include top and bottom walls secured to the inner sides of the flanges of the channel side walls. The leg portion of the L-shaped locking member pivotally connected to the top wall of the socket member includes a finger engaging portion extending perpendicularly outwardly of the other leg portion.

Conventional trailer vehicles have tongue assemblies which are rigid and require moving the whole trailer for aligning the hitch assembly on the trailer with the hitch means on the leading vehicle. Moreover, conventional tongue assemblies are complicated in their design and are not built integrally into the frame of the trailer vehicle.

It is therefore one of the principal objects of this invention to provide a hitch assembly for a trailer vehicle wherein the hitch may be readily positioned for its connection to the leading vehicle hitch means without moving the whole trailer vehicle. It is further contemplated that this hitch assembly will be capable of readily being adjusted between a rigid position of use and a hitching position wherein the tongue member of the hitch assembly is relatively free to move transversely and longitudinally such that it may be connected to the leading vehicle. This hitch assembly may be readily adjusted as the tongue member is locked into a rigid position by having a wedge shaped portion on one end received in a socket portion when the hitch assembly is extended and a locking member pivots into engagement with the inner end of the wedge shaped portion to maintain it in its rigid position. By simply pivoting the locking member upwardly out of engagement with the inner end of the wedge shaped portion of the tongue, the tongue is readily moved to any desired position longitudinally and transversely of the trailer frame.

A further object of this invention is to provide a hitch assembly which utilizes the channel frame construction of the trailer in forming the socket portion of the hitch assembly which includes a pair of converging channel portions adapted to matingly engage opposite sides of a wedge shaped portion on the inner end of the hitch tongue.

A still further object of this invention is to provide a hitch assembly having a circular in cross-section tongue member extending through a rectangular in cross-section opening but having a flat plate element or shoulder formed on the outer surface of the tongue member for mating engagement with the flat sidewalls of the socket opening and thereby limiting rotational movement between the tongue member and the socket member as well as distributing the frictional wear over a larger area on the tongue member.

A further object of this invention is to provide a hitch assembly which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
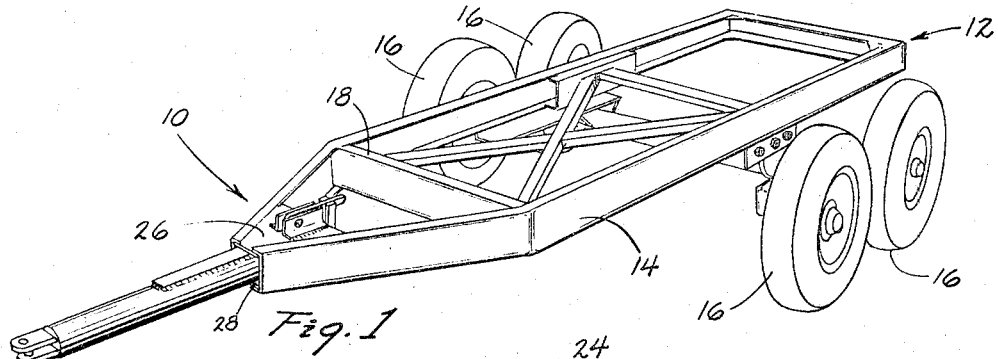
FIG. 1 is a perspective view of the trailer vehicle with the hitch assembly of this invention mounted integrally thereon.

In FIG. 1 of the drawings the hitch assembly is generally referred to by the reference numeral 10 and is shown mounted on a trailer vehicle 12. The trailer 12 has a rectangular channel frame 14 supported by wheels 16. At the forward end of the frame 14 a cross frame channel member 18 is provided.

Figure 4:
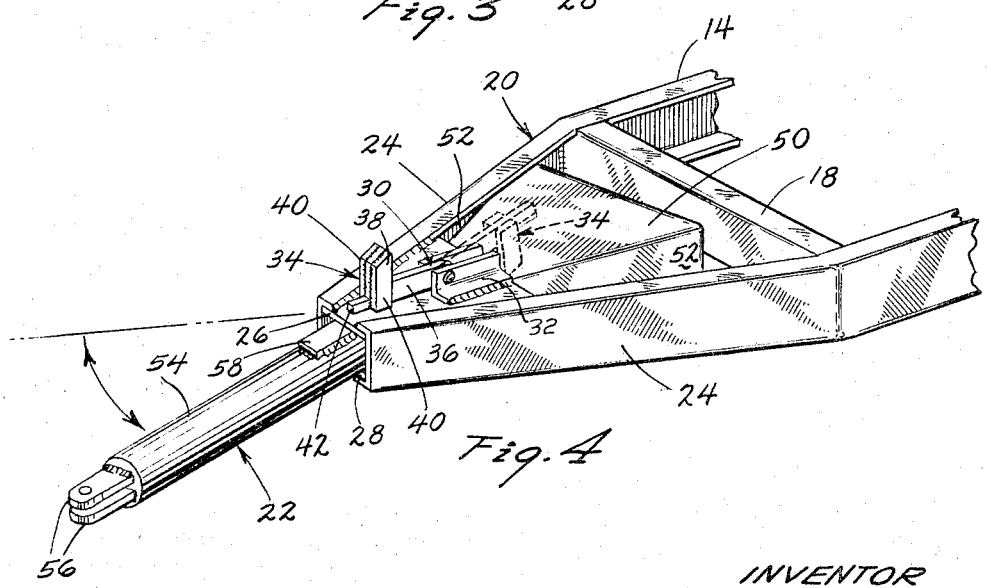
FIG. 4 is an enlarged perspective fragmentary view of the hitch assembly with the tongue member retracted to its position for adjustment into alignment with the hitch means on a leading vehicle.

The hitch assembly 10 includes a female socket unit 20 and a male tongue member 22 as seen in FIG. 4. The female socket unit 20 is formed by the parallel channel frame members of the trailer frame 14 having portions 24 extending forwardly of the cross member 18 and in converging relationship. Top and bottom walls are formed by a pair of triangular shaped plate elements 26 and 28 respectively welded to the inner surfaces of the flanges of the channel portions 24.

A locking unit 30 is mounted on the top plate 26 and includes a pair of L-shaped elements 32 having an L-shaped locking member 34 pivotally connected thereto. The locking member 34 includes a first leg portion 36 pivotally connected to the L-shaped elements 32 and its outer leg portion 38 positioned to extend downwardly over the end of the top plate 26. Extra weight and strength is provided in the leg 38 by the addition of plate elements 40 extending lengthwise therealong. A finger engaging element 42 is provided on the leg 40 on the opposite side from the leg 36.

Figure 2:
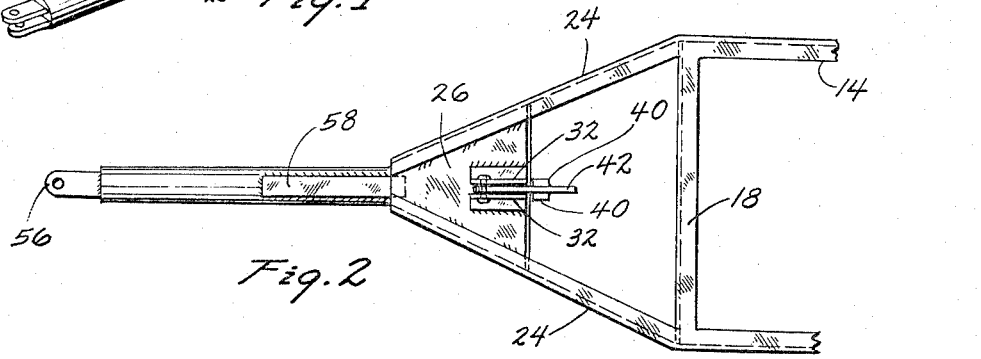
FIG. 2 is a fragmentary top plan view of the hitch assembly on the trailer vehicle.

The male tongue member 22 includes on its inner end a wedge-shaped portion 50 having converging sidewalls 52 for mating engagement with the base portions of the channel-shaped portions 24 of the socket assembly 20. An elongated circular in cross-section male tongue member 54 extends from the vertex of the wedge-shaped portion 50 and through the outer open end of the socket assembly 20. A pair of clevis plates 56 are provided on the forwardmost end of the tongue member 22. A flat shoulder 58 is formed on the top surface of the cylindrical in cross-section tongue member 54 by a flat plate element 58 which is welded thereto and is adapted to bear against the inner or lower face of the top plate 26 in the socket assembly 20. Accordingly the frictional wear produced as the tongue member 22 moves relative to the socket member 20 is distributed over a larger area than would be the case if the cylindrical tongue member 22 was in direct engagement with the sidewalls of the socket assembly 20. Additionally, the plate element 58 limits the tongue member 22 against rotational movement relative to the socket member 20. The plate element 58 is sufficiently long to be in contact with the top plate 26 when the tongue member 22 is retracted as shown in FIG. 4 or extended as shown in FIG. 2. It is noted that the greatest frictional wear will be on the top side of the tongue member 54 as the forward end of the trailer 12 will tend to pivot downwardly against the top side of the tongue 54 and accordingly the plate element 58 will shoulder the frictional and weight forces.

Figure 3:
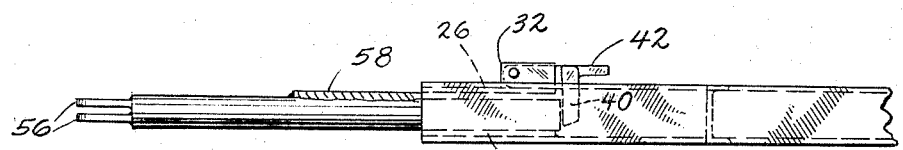
FIG. 3 is a side elevational view of the structure shown in FIG. 2.

In operation, it is apparent that the leading vehicle (not shown) and the trailing vehicle 12 would be moved as closely together as possible and then the locking member 34 is raised out of engagement with the wedge-shaped portion 50 such that the tongue member 22 may be moved to any desired position longitudinally and laterally of the socket unit 20 such that the clevis plates 56 may be connected to the hitch means on the leading vehicle. The locking member 34 may then be pivoted rearwardly onto the top of the wedge-shaped portion 50 as shown by the dash lines in FIG. 4 and the leading vehicle upon moving forwardly will pull the tongue member 22 forwardly and consequently the wedge-shaped portion 50 into its mating engagement position with the converging channel portions 24. When the tongue 22 is fully extended relative to the socket member 20, the locking member 34 will drop by gravity over the rear edge of the wedge-shaped portion 50 and thus lock the hitch assembly in its extended position of FIGS. 1, 2 and 3. The extra weight provided by the plates 40 serve to maintain the locking member 34 in its down or locking position shown in FIGS. 1, 2 and 3. To unlock the hitch assembly 10 it is only necessary to manually lift the locking member 34 up by engaging the element 42 whereby the tongue member 22 may be moved to any desired position as shown in FIG. 4.

It is to be appreciated that fabrication of the trailer and its hitch assembly 10 is greatly simplified by taking advantage of the channel-shaped frame 14 and extending the channel portions 24 to form the sidewalls of the socket unit 20 for receiving the wedge-shaped portion 50 and holding it in its locked position. A simplified and rugged in construction hitch assembly is thereby provided.

Some changes may be made in the construction and arrangement of my hitch assembly without departing from the real spirit and purpose of my invention, and it is my intention to cover by my claims, any modified forms of structure or use of mechanical equivalents which may be reasonably included within their scope.

I claim:
1. A tongue assembly for a vehicle, comprising:
   a female socket member having an opening with top and bottom walls and converging sidewalls,
   a male member extending through said opening and having a wedge-shaped end portion comprising a top wall and converging side edges for mating engagement with said converging sidewalls when said male and female members are in an extended position, said top wall of said wedge shaped end portion being solid and extending between substantially the full length of said converging side edges,
   a releasable locking member pivotally carried on said top wall of said socket member for slidable engagement with said top wall when said members are in a contracted position and for locking engagement with the inner end edge of said wedge-shaped end portion when said members are in said extended position to limit said members against inward relative movement to said contracted position, and
   said socket member top and bottom walls being disposed in parallel relationship and said male member including an outer end portion substantially circular in cross-section along its length and a longitudinally extending flat shoulder element on the top side of said outer end portion for mating engagement with the lower side of said top wall of said socket member thereby limiting relative rotation of said male and female members and providing an enlarged bearing surface on said outer end portion of said male member.

2. The structure of claim 1 wherein said locking member is L-shaped with one leg portion pivoted to said top wall of said socket portion and the other leg portion adapted to extend downwardly across the longitudinal inner end edges of said top walls of said wedge shaped portion and said socket member when said members are in said extended position, and said one leg is in engagement along its substantial length with said top wall of said socket member when said members are extended to limit further downward pivoting of said locking member.

3. The structure of claim 2 wherein said converging sidewalls are integrally connected to frame members disposed in parallel relationship and forming the sides of a frame of a trailer.

4. The structure of claim 3 wherein said converging sidewalls and said frame members are channel-shaped in cross-section and face towards each other.

5. The structure of claim 4 wherein said female socket member having top and bottom side walls has a cross frame member interconnecting the said trailer frame member adjacent said converging sidewalls; said cross frame member, said top and bottom side walls and said converging sidewalls of said socket member define an enlarged opening in which said wedge portion of said male member can move when said male and female members are moved inwardly relative to each other to said retracted position.

6. The structure of claim 5 wherein said socket member top and bottom sidewalls are secured along their edges to the inner sides of the flanges of said converging channel sidewalls.

7. The structure of claim 5 wherein upon said male and female members being moved to their extended position with said wedge-shaped portion in said socket member, said other leg will drop by gravity only into locking engagement with the end edge of said wedge-shaped portion, and said other leg being substantially narrower in width than said socket member and said wedge-shaped portion.

8. The structure of claim 7 wherein said one leg portion of said locking member includes a finger engaging portion extending perpendicularly outwardly of said other leg portion.

References Cited
UNITED STATES PATENTS

| 2,918,310 | 12/1959 | Carson | 280—478 |
| 2,988,383 | 6/1961 | Carson | 280—478 |
| 3,019,032 | 1/1962 | Oehler et al. | 280—478 |
| 3,279,819 | 10/1966 | Edmonds | 280—478 |

LEO FRIAGLIA, *Primary Examiner.*